March 7, 1967  S. MACKRLE ETAL  3,307,702
SLUDGE BLANKET CLARIFIER FOR WATER TREATMENT
Filed Aug. 26, 1964  4 Sheets-Sheet 4

INVENTORS
Svatopluk Mackrle
Vladimir Mackrle
Vitrich Dracka
Lubomir Paseka
BY
Michael J. Striker

United States Patent Office 3,307,702
Patented Mar. 7, 1967

3,307,702
SLUDGE BLANKET CLARIFIER FOR
WATER TREATMENT
Svatopluk Mackrle, Brno, Vladimir Mackrle, Prague, Oldrich Dracka, Brno, and Lubomi Paseka, Brno, Czechoslovakia, assignors to Ceskoslovenska akademie ved, Prague, Czechoslovakia
Filed Aug. 26, 1964, Ser. No. 392,097
Claims priority, application Czechoslovakia, Aug. 28, 1963, 4,793/63; Mar. 3, 1964, 1,210/64
10 Claims. (Cl. 210—200)

This invention relates to an improved clarifier for the treatment of water.

In view of the constant increase in urban concentrations the treatment of water, has assumed steadily greater importance. The principle of water treatment on a large scale is well established: the water is coagulated either by chemical or by biological processes and sludge resulting from coagulation is separated from the water. For the separation of sludge different separation processes are used like sedimentation, rapid sand filtration and sludge blanket clarification. The most advantageous process for separation of a large quantity of sludge is the sludge blanket clarification.

In sludge blanket clarifiers the most important factor governing capacity and efficiency is the uniformity of vertical flow through the sludge blanket. In turn, this uniformity depends to a large extent on the inlet conditions into the sludge blanket zone. To achieve a uniform flow different distribution systems are being used. According to the systems, clarifiers now being in general use may be divided into three categories:

(1) Clarifiers having a central inlet,
(2) Clarifiers having a central inlet,
(3) Clarifiers having a tube distribution system.

As small, low-capacity plants all of these clarifiers are very well feasible. However, attempts to make these units economically more practical by increasing their size have encountered difficulties with the result that existing large clarifiers do not achieve a specific output per unit of volume comparable with the specific output of small clarifiers of the same type. Consequently, the upflow rate of large clarifiers is either small, as in the case of clarifiers having a tube distribution system, or a high upflow rate is achieved at the expense of an inordinate increase of height of the plant. For example, slot clarifiers for an output higher than 100 liters per second require an excessive constructional height with an attendant rapid decrease in the specific output per unit volume. In the case of clarifiers having a central inlet the conditions in large plants are still less favorable.

Of the large capacity plants used heretofore the pulsating type of clarifier, so-called pulsators, which belong into the category of clarifiers having a tube distribution system, have been the most successful. In this type of clarifier, the liquid to be treated is distributed through perforated tubes into vessels of rectangular or circular shape. To achieve uniform distribution of flow through the orifices of all distribution tubes and in order to prevent sedimentation in the tubes a pulsation is applied. However, this type of clarifier has several drawbacks. As a result of the pulsation the mean volume of flow per square unit of sludge blanket surface is necessarily smaller than that to be obtained in cases where the flow remains uniform, that is, where it is not intermittent. Furthermore, a considerable portion of the pulsating type of clarifier is occupied by the sludge concentrator and the overflow of floc particles into the sludge concentrator proceeds only under the influence of gravity. As a result of the pulsation, and also because the overflow of floc into the sludge concentrator is largely influenced by density currents resulting from temperature and density differences in the sludge concentrator, the clarification and efficiency of this type of apparatus is reduced. Also, the area above the sludge concentrator is not utilized for separation of the suspension thus reducing further the output per unit of volume. Finally, the application of a pulse, or intermittent flow, requires special devices and energy supplies and complicated tube distribution systems with a large number of orifices are subject to failures due to clogging.

It is a general object of the invention to provide an improved clarifier for the treatment of water.

A more specific object of the invention is to provide an improved sludge blanket clarifier not subject to the above-described drawbacks.

Yet a more specific object of the invention is to provide a sludge blanket clarifier having a higher upflow rate and a more uniform distribution of the liquid to be treated than devices known heretofore.

Still more specifically, it is an object of the invention to provide such a sludge blanket clarifier with elements comprising at least four functional zones and to provide a common water distribution system therefor.

We have found that by suitably arranging the functional zones of the clarifier, and by the appropriate design of the inlet into the filtration zone it is possible to construct a clarifier of any required output having a small constructional height. With such an arrangement we have achieved uniform distribution of flow into and through the sludge blanket without the use of a pulsating device; as a result, we were able to increase the upflow rate sharply. The formation of interfering currents has been eliminated by provision of forced uniform flow in all of the functional zones, a factor tending to increase the efficiency of the unit, especially in connection with collection of the settled water from the sedimentation zone. Moreover, the described concept makes it possible to reconstruct most of the presently used sedimentation tanks and thus to increase their efficiency at relatively low cost.

In constructing our clarifier we provide a common reactor consisting of one or more functional elements which may be arranged side by side in the shape of elongated chambers or concentrically in an annular housing. Each of these elements comprises four functional zones, namely a coagulation zone, a filtration zone, a sedimentation zone, and a clear water zone. The filtration zone has the cross section of the shape of an inverted triangle, that is, it widens diffuser-like in an upward direction and communicates with a clear water zone above. The coagulation zone and sedimentation zone are located alongside the filtration zone. The liquid to be treated, to which a coagulating agent has previously been added, is distributed by a suitable distribution system into the coagulation zone of each functional element.

The liquid passes in a downward flow into and through the coagulation zone where distribution baffles may be provided to homogenize the flow and to provide favorable coagulation conditions. The liquid leaves the coagulation zone at the lower part thereof through a suitably arranged and dimensioned outlet and enters the lower part of the filtration zone in an upward direction and at a velocity sufficient to maintain the sludge blanket floating in the filtration zone in a fully fluidized condition and to prevent any sedimentation of the sludge blanket. To achieve a more uniform vertical flow in the filtration zone, distributing baffles may be located therein. On meeting the sludge blanket the coagulated particles, or floc, are captured therein and the liquid passes through the blanket to the upper clear water zone. Adjacent the upper edge of the filtration zone there is located a weir, or outlet, through which excess sludge is withdrawn from the filtration zone in downward flow into the sedimentation zone. Sludge settling in the sedimentation zone is periodically removed. The clear liquid penetrating through the sludge blanket into the clear water zone above the filtration zone is collected by a clear water collecting system and withdrawn. Similarly, the settled water from the upper part of the sedimentation zone is collected and drawn out.

It will be clear that a number of elements, each having the above-mentioned zones, may be arranged in a common vessel. If such elements are suitably arranged, zones having identical functions may be connected with one another.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
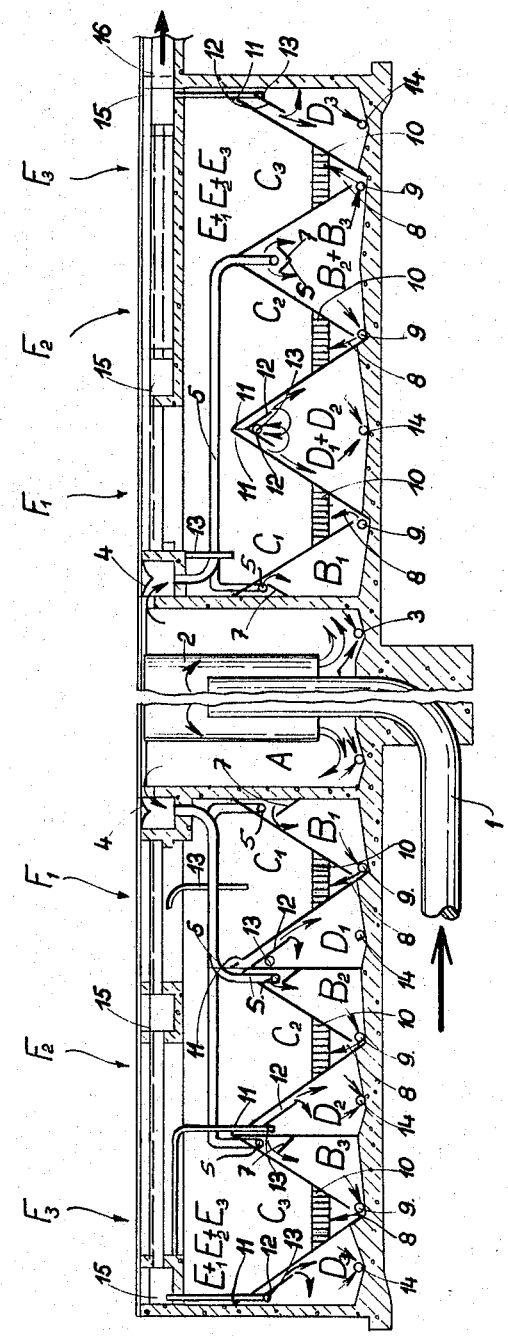
FIG. 1a is a sectional view of a clarifier embodying our invention and taken on the line II—II of FIG. 2.
FIG. 1b is a view largely identical to that of FIG. 1a, but shows common functional zones of adjacent elements connected together.

The clarifier of FIG. 1a, only half of which is shown, the other half being a mirror image in view of the annularity of the plant, has three functional elements concentrically arranged within a common housing. Water to be treated enters through the pipe 1 into a common mixing zone A at the center of the tank. A circular baffle 2 surrounds the outlet of pipe 1 within chamber A and directs the flow of liquid downwardly from where it then moves upwards to the top of chamber A and enters the water-distribution system 4. Drainage pipes 3 at the bottom of chamber A permit the draining thereof when the system is to be shut down. The liquid with which a coagulant, added to it prior to the introduction into the chamber A, has been thoroughly admixed in the latter, passes from the distribution system 4 through a plurality of pipes 5 into the various coagulation zones $B_1$, $B_2$, $B_3$ of the concentric functional elements. Baffles 7 are so positioned as to distribute the flow of liquid from the outlets 6 of pipes 5 in the coagulation zones. On reaching the bottom of the zones B the flow enters the filtration zones $C_1$, $C_2$, $C_3$ in an upward direction through suitably dimensioned inlets 8 located at the bottoms of zones C. For draining and rinsing zones B are provided in the vicinity of the inlets 8 with pipes 9. Upon entering the filtration zones C the now coagulated mixture flows through baffles 10 disposed in its path for the purpose of promoting more uniform flow. Coagulated particles, or floc, of the mixture are retained in the blanket of sludge and the now substantially clear liquid rises therethrough into the upper clear water zones $E_1$, $E_2$, and $E_3$ which, for purposes of simplicity, may all be connected. From there the liquid enters a clear-water distribution system 15 and leaves the tank through a channel or pipe 16.

In view of the continuously increasing volume of the sludge blanket provision must be made for withdrawing excess sludge. To this end overflow weirs or outlets 11 are provided adjacent the top edge of each of the filtration zones C. Upon the sludge blanket reaching a predetermined thickness the excess is forced to flow through these openings 11 into adjacent sedimentation zones $D_1$, $D_2$ and $D_3$ where the solid particles settle at the bottom. The flow of these particles may be directed by suitable baffles 12, disposed in their path. The concentrated sludge settled at the bottom of the sedimentation zones D is periodically removed through pipes 14 and the clear water is withdrawn from the top part of the zone by way of pipes 13 communicating with the clear water system 15–16.

As shown in FIG. 1b, which is otherwise identical with FIG. 1a, it is possible to combine adjacent zones (i.e. $B_2$, $B_3$; $D_1$, $D_2$) of multple elements $F_1$, $F_2$, $F_3$ to simplify construction of the device.

Figure 2:
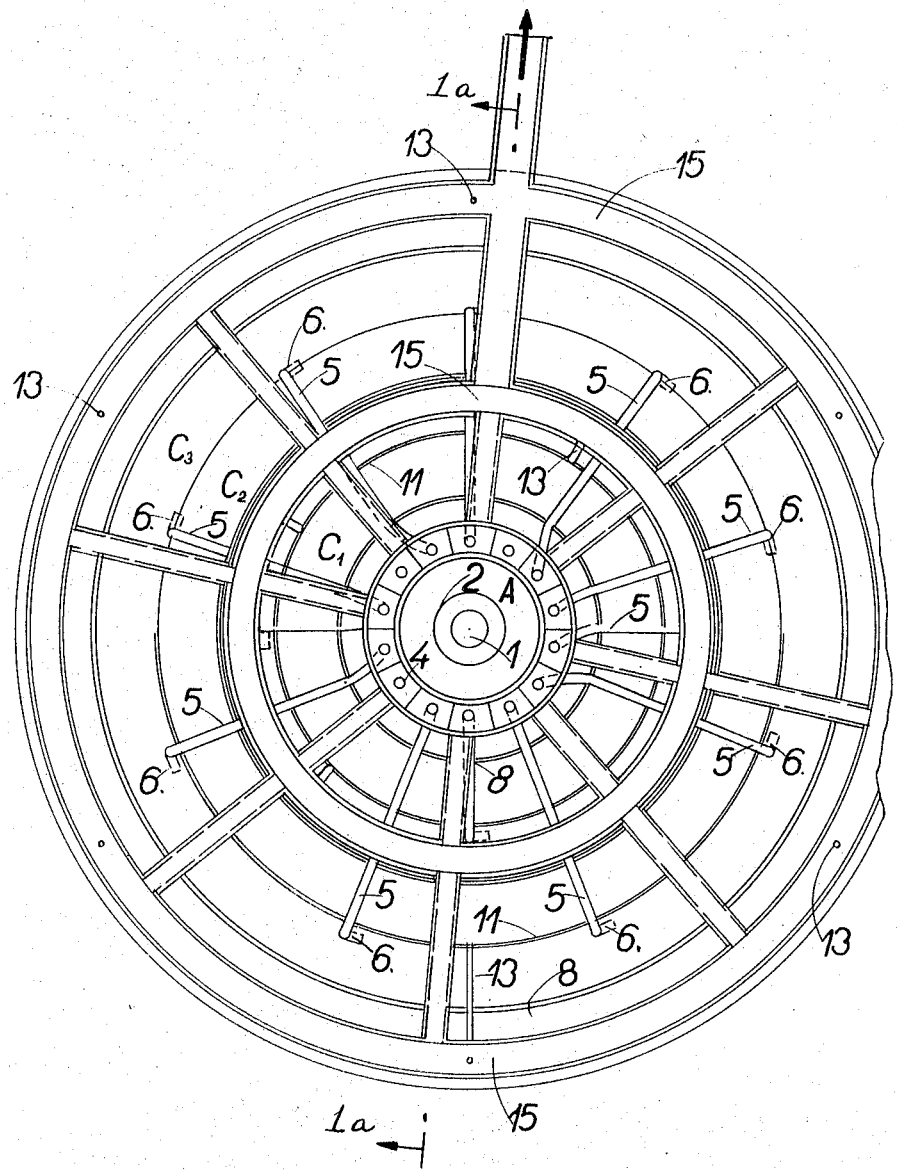
FIG. 2 is a top view of a circular clarifier embodying our invention.
Figure 3:
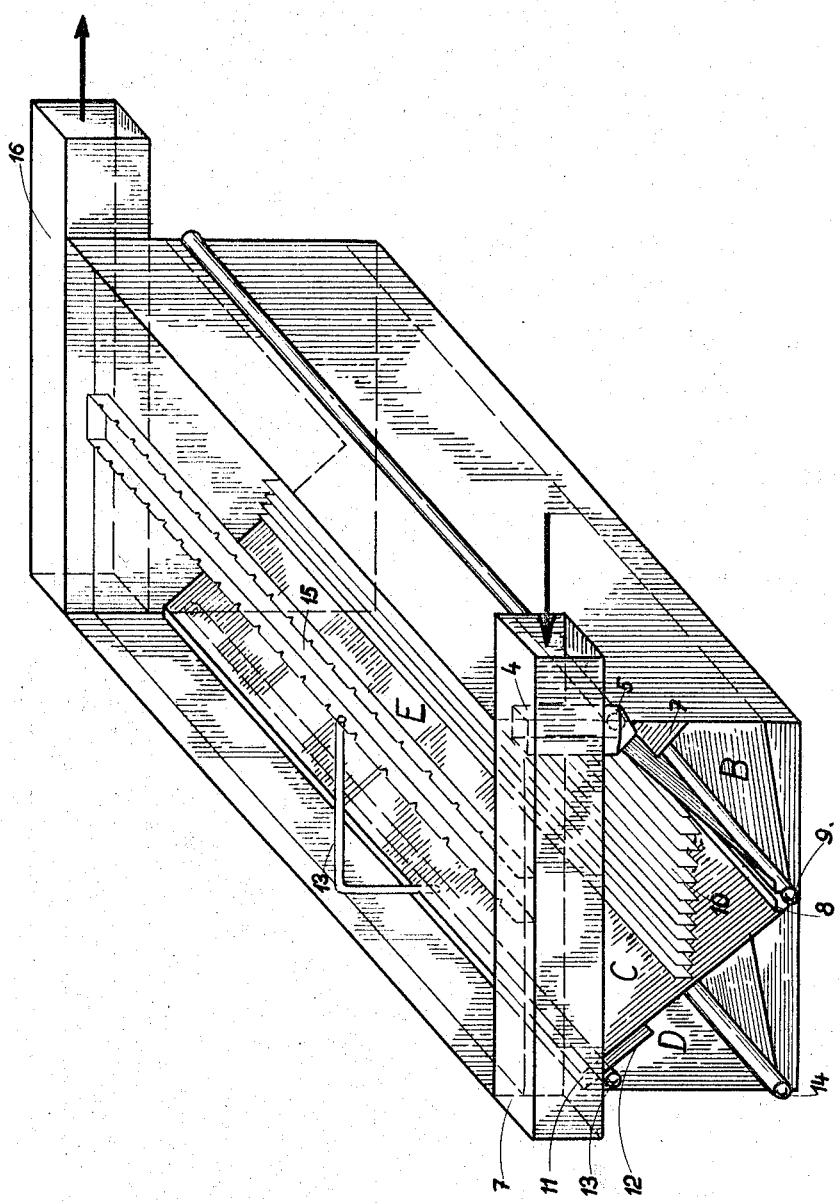
FIG. 3 is an isometric view of a functional element of a rectangular clarifier embodying our invention.

FIG. 2 clearly shows in a top view the clear water distribution system 15 and 16. The shape of the functional element as will be seen from FIG. 3 is by no means restricted, to an annular housing with concertic zones. The device may also be constituted in the form of elongated channels or compartments to which the liquid to be treated is added by way of the distribution system 4. From there it is led via the pipe 5 into the coagulation zones B. Further operation of the unit is identical with that heretofore described with reference to FIG. 1.

Figure 4:
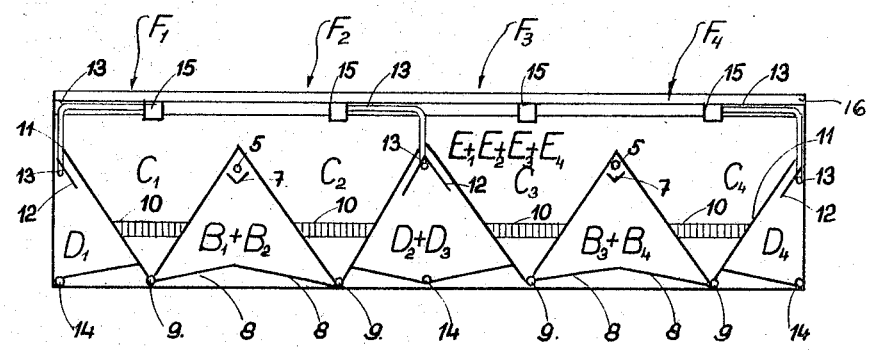
FIG. 4 is a sectional view of a rectangular clarifier taken on the line V—V. of FIG. 5.
Figure 5:
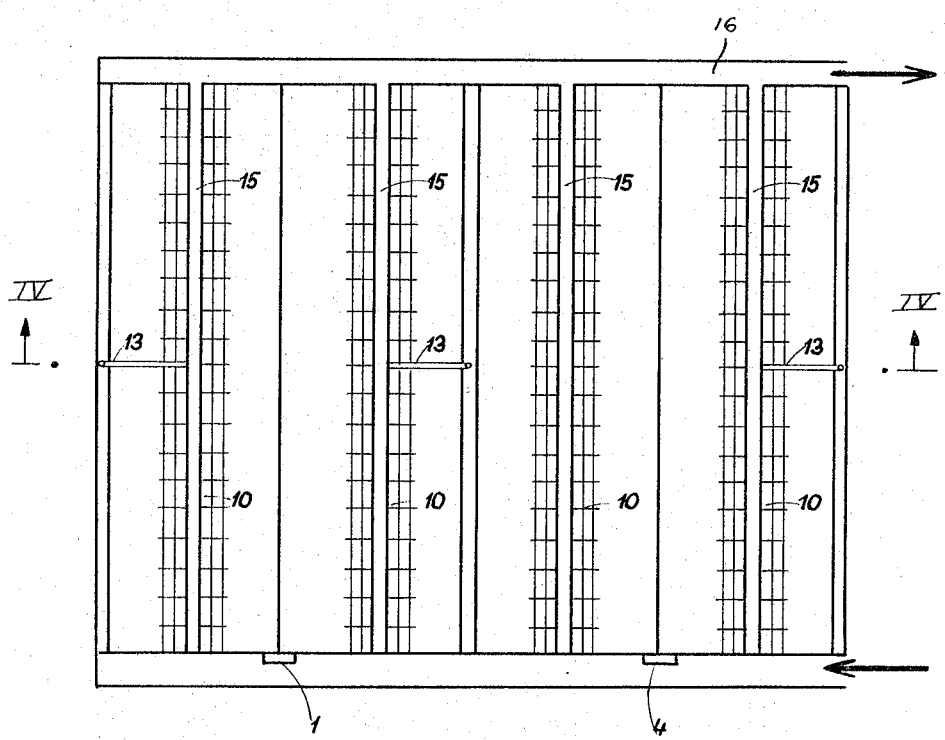
FIG. 5 is a top view of the embodiment shown in FIG. 4.

A number of the elements shown in FIG. 3 may be combined as illustrated in FIGS. 4 and 5, identical ones of their functional zones being interconnected as disclosed in the description of FIG. 1b. A clarifier constructed in this manner would be generally rectangular and the elements would be so arranged as to have some of their zones disposed side-by-side and interconnected, e.g. $C_1$ and $C_2$, $D_1$ and $D_2$, etc. Such a construction naturally reduces the network of connections required and is thus more economical.

In operation, a constant stream of water is fed into the chamber A where the coagulating agent previously added to it is thoroughly admixed with the water. The mixture then enters the zone B via the distribution system 4 and the pipes 5. In its downward flow it encounters baffles 7 which promote the uniformity of flow. In this zone B the coagulation takes place.

The coagulated mixture leaves zone B at the bottom and flows upwards and into the filtration zone C. The outlet from zone B to zone C is so dimensioned that the velocity at which the liquid enters zone C causes the floc particles to remain suspended in the zone C. This process is aided by baffles 10 located in the path of the mixture and promoting substantially uniform flow in the upwardly diverging zone. With continued operation of the clarifier the suspended particles will form a layer or sludge blanket constantly growing in thickness as it filters out and retains additional particles. It is necessary, of course, that the inlet velocity of the coagulated mixture into zone C be sufficient to prevent sedimentation of the sludge blanket at any thickness and to keep it in fluidized condition.

When the blanket reaches a predetermined thickness the excess flows over a weir 11 downwardly into a sedimentation zone D where the sludge particles settle at the bottom. The clear liquid in the sedimentation zone D above the sedimented particles rises through pipes 13 and enters the distribution system 15.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A water treatment apparatus comprising, in combination, a housing having a peripheral wall and the latter having a top edge, a first wall in said housing parallel to said peripheral wall and defining a relatively small inner chamber and a relatively larger outer chamber surrounding said inner chamber; a plurality of other walls disposed in said relatively large outer chamber, said walls having respective upper ends and being successively oppositely inclined and concentric with said peripheral wall while being transversely spaced therefrom, said other walls defining a plurality of horizontally arrayed compartments, successive ones of said compartments having alternately inverted triangular cross-sections, said upper ends of said other walls defining with said top edge of said peripheral wall a reservoir space above said compartments; at least a pair of said compartments being substantially completely closed and at least one further one of said compartments being upwardly open and communicating with said reservoir space; feeding means including conduit means communicating with said inner chamber for conveying a continuous stream of a mixture consisting of water to be treated and a coagulating agent from a location remote from said housing into said inner chamber; means including baffle means in said inner chamber for promoting the uniformity of flow of said stream therein and for thoroughly admixing said agent and said water; passage means in said inner chamber and communicating with a first one of said closed compartments adjacent the upper end thereof for directing a downward flow of said mixture thereinto; baffle means in said first one of said closed compartments disposed in the path of said flow for promoting uniform flow in said water and inducing coagulation thereof; passage means in the lower end of said first closed compartment communicating with the lower end of said at least one further one of said compartments for admitting an upward flow of said coagulated mixture thereto and for forming therein a floating layer of sludge gradually increasing in thickness while causing liquid contained in said mixture to rise through said layer and enter said reservoir space in substantially clarified form; passage means in said at least one further compartment in the region of said upper end and communicating with a second one of said closed compartments for permitting a downward flow thereinto of a portion of said sludge upon said layer exceeding a predetermined thickness; means, including baffle means in said further one of said compartments and said second one of said compartments and disposed in the path of said mixture and said sludge, respectively, for respectively promoting uniformity of flow whereby to prevent sedimentation of said mixture, and to direct the flow of said portion of sludge whereby to induce the formation of sediment; first discharge means adjacent said top edge of said peripheral wall and communicating with a top portion of said reservoir space for continuously withdrawing liquid therefrom; and second discharge means communicating with said second one of said closed compartments adjacent the bottom thereof for intermittently withdrawing said sediment.

2. A water treatment apparatus as defined in claim 1, wherein said passage means in said first closed compartment has a cross-section so dimensioned as to permit an upward flow of said mixture at a velocity sufficient to prevent sedimentation of the coagulated particles contained in said mixture and of said layer of sludge.

3. A water treatment apparatus, comprising, in combination, a housing containing a plurality of similar clarifying units each including a downwardly diverging first compartment constituting a coagulation zone, an upwardly diverging second compartment constituting a filtration zone, and a downwardly diverging third compartment constituting a sedimentation zone, said housing defining upwardly of said units a clear-water collection zone; feed means for feeding a mixture of raw water and a coagulation agent downwardly into each first compartment for inducing coagulation therein; and means for enabling flow of the coagulated mixture from each first compartment into the bottom of the respective second compartment and upwardly therein whereby a floating layer of sludge gradually increasing in thickness forms at the top of each second compartment while liquid rises through said layer and enters said clear-water collection zone, said third compartment being arranged to receive sludge overflowing at the tops of the respective second compartments.

4. A water treatment apparatus, comprising, in combination, a housing including bottom wall means, side wall extending upwardly from said bottom wall means and defining therewith an enclosed space, and partition means arranged in said space and defining with said wall means adjacent said bottom wall means a plurality of clarifying units each including a first compartment of downwardly diverging triangular cross-section constituting a coagulation zone, a second compartment of upwardly diverging triangular cross-section constituting a filtration zone and communicating at the bottom thereof with said first compartment, and a third compartment of downwardly diverging triangular cross-section constituting a sedimentation zone and communicating, at the top thereof with said second compartment, said side wall means defining above said compartments a clear-water collection zone; and means for feeding a mixture of raw water and a coagulating agent into said first compartments for coagulation therein and for subsequent flow of the coagulated mixture into the bottoms of said second compartments and in upward direction in the latter, whereby a floating layer of sludge gradually increasing in thickness forms at the tops of said second compartments while liquid rises through said layer and enters said clear-water collection zone, said third compartments being arranged to receive sludge overflowing at the tops of said second compartments.

5. A water treatment apparatus as set forth in claim 4, wherein said units are of annular shape and arranged concentrically.

6. A water treatment apparatus as set forth in claim 4, wherein said units are straight and arranged side by side.

7. A water treatment apparatus as set forth in claim 4, and further comprising baffle walls arranged near the top of said third compartment, said baffle walls adapted to promote the flow of the mixture entering the third compartment along one of its walls; and discharge means for withdrawing liquid near the top of said third compartment.

8. A water treatment apparatus as set forth in claim 4, and further comprising baffle walls arranged below the top of said second compartment, said baffle walls promoting an intimate contact of the treated water with the coagulation agent admitted therewith.

9. A water treatment apparatus as set forth in claim 4, wherein each of said compartments is provided with drainage means for cleaning purposes.

10. A water treatment apparatus as set forth in claim 4, wherein adjacent coagulation and sedimentation zones of adjacent ones of said units are common to such adjacent units.

References Cited by the Examiner

UNITED STATES PATENTS

| 2,213,808 | 9/1940 | von Stietz | 210—20 |
| 2,425,372 | 8/1947 | Green | 210—20 |
| 2,464,617 | 3/1949 | Sebald | 210—207 X |

FOREIGN PATENTS

| 752,077 | 7/1956 | Great Britain. |

MORRIS O. WOLK, *Primary Examiner.*

MICHAEL E. RODGERS, *Examiner.*